3,328,379
POLYMERIZATION OF OLEFINS WITH RADIATION AND AN AMMONIA ACCELERATOR
Jacques Grosmangin and Bernard Besancon, Le Havre, and Jean-Claude Petit, Gonfreville l'Orcher, France, assignors to Société Anonyme dite: Compagnie Francaise de Raffinage, Paris, Seine, France, a corporation of France
No Drawing. Filed Mar. 26, 1963, Ser. No. 267,961
Claims priority, application France, Apr. 6, 1962, 893,654; Jan. 25, 1963, 922,631
16 Claims. (Cl. 260—94.9)

This invention relates to the polymerization of olefins, such as ethylene, under the action of various ionizing irradiations and, more particularly, to the polymerization of ethylene in such irradiating techniques in the presence of ammonia as a catalytic or reactant agent for obtaining enhanced polymerization results and improved polymeric products.

As is now well understood, a variety of industrial processes are available by which material such as ethylene may be polymerized to provide normally solid polymers, which various processes include so-called "high pressure" and "low pressure" polymerizations. According to the former, ethylene is polymezide by subjecting to temperatures of the order of 100°–300° C. under pressures of 1,000–2,500 atms. in the presence of very small proportions (perhaps 0.01%) of oxygen or organic peroxides as catalysts. The "low pressure" techniques, on the other hand, are characterized by employing pressures ordinarily between 1 and 100 atms., while the ethylene is treated as dissolved in an organic solvent and in the presence of solid metallic or organometallic catalysts at temperatures of the order of 50° to 150° C. Generally speaking, the polyethylene materials obtained by the "low pressure" techniques are distinguished from a "high pressure" polymers by having higher densities, different crystal structures, greater resistance to stretching, higher melting points, etc. By contrast, they present several disadvantages which are avoided by the "high pressure" polyethylenes, such as retention of catalysts in a manner which is very difficult to eliminate. tendency to fail under compression, etc.

As also now understood, polymerization of materials such as ethylene is also accomplished under the action of ionizing and penertating irradiation with beta rays, gamma rays, X-rays, and neutron bombardment. Such processes have the advantage of being substantially more simple than the catalytic processes generally utilized in industry. For example, a reactor is charged with ethylene under pressure and is simply exposed to the desired radiation, while the temperature is controlled to influence the speed of reaction and the quality of polymer desired. Nevertheless, despite the attractiveness of such simplicity, such irradiation polymerization processes may not produce results desired for large scale commercial or industrial application because of, for example, relatively low reaction or conversion speeds, etc. At least, such commercial disadvantages may be experienced without operating at pressures of the order of 1,000 atms. and/or at radiation intensities higher than may be economical or conveniently desired with large scale industrial installations.

According to this invention, however, there are provided processes and techniques for the polymerization of ethylene under the effect of ionizing irradiation for use with commercial scale installations and in which the polymerization is conducted at fairly moderate temperature and pressure conditions and without utilizing solid catalysts, yet achieving reaction rates satisfactorily advanced for commercial operating economies; and with operations in accordance herewith being conducted in the presence of small portions of ammonia among the reacting materials, to produce not only the enhanced economies and simplicity of the reaction conditions, but also solid ethylene polymers of enhanced characteristics. As a further feature of this invention, even more enhanced results are achieved by subjecting the ethylene starting reactant (whether polymer or monomer) and/or the ammonia reactant to additional purification steps or processes for the utilization of extremely pure materials for achieving even higher conversion yields monomer to polymer.

With the foregoing and additional objects in view, this invention will now be described in more detail, and other objects and advantages thereof will be apparent from the following description and the appended claims.

In operations embodying and for practicing this invention, the advantages hereof are in a large manner achieved primarily by including in the ethylene material to be polymerized (whether all monomeric or partially polymeric) a relatively small quantity of ammonia, for example, up to about 20 moles of ammonia per 100 moles of ethylene. Under such conditions, the polymerization reaction or process proceeds substantially more rapidly than operations under the same conditions but in the absence of ammonia. Merely as indicative of the foregoing, certain data are accumulated in the following table relating to a number of runs conducted in accordance herewith all at the ambient temperature of about 19° C.) in an autoclave (having a volume of about ⅕ liter) under irradiation by gamma rays emitted by a source of radioactive cobalt 60 (at 3,000 curies) at an intensity of about 504 rads per minute, but under varying conditions of molar concentration or ratios of ethylene and ammonia. In this table, the concentration of ethylene is noted in the first column as mean concentration of the moles of ethylene introduced into the autoclave per liter of material introduced, and the amount of ammonia is noted as mole percent or molar ratio of ammonia to ethylene, while the conversion is expressed in terms of percent of ethylene polymerized in 24 hours.

TABLE I

| Conc. $C_2H_4$ | Mole Percent $NH_3$ | Conversion, Percent in 24 hr. | Pressure, atms. |
|---|---|---|---|
| 6 | 0 | 1.1 | 58 |
|   | 6 | 1.9 | 66 |
| 9 | 0 | 2.4 | 65 |
|   | 3 | 4.7 | 75 |
|   | 10 | 4.3 | 75 |
|   | 20 | 3.9 | 80 |
| 12 | 0 | 7.7 | 100 |
|   | 3 | 11.2 | 110 |
|   | 10 | 10.4 | 115 |
|   | 20 | 8.2 | 125 |
| 15 | 0 | 9.8 | 235 |
|   | 3 | 30.0 | 250 |
|   | 6 | 35.0 | 260 |
|   | 10 | 32.1 | 270 |
|   | 20 | 15. | 365 |
| 16 | 0 | 17.5 | 335 |
|   | 3 | 42.6 | 350 |
|   | 10 | 48.0 | 410 |

As will be apparent from the foregoing data operations in accordance herewith provide progressive enhancement of the conversion of the same quantity ethylene after a given time by progressively increasing the proportion of ammonia, but up to a maximum. For example, with a concentration of ethylene of 15 moles per liter, the maximum conversion realized at 19° C. rose to 35% in 24 hours utilizing a proportion of ammonia of 6 mole percent. In the absence of ammonia, under the same conditions, only 9.8% of the ethylene was converted, while the conversion rate fell to only 15.2% when the ammonia component was increased to 20 mole percent. As will be understood in accordance herewith, the optimal quantity or proportion of ammonia to utilize varies somewhat as a function of the concentration of the ethylene, but, under operations as in the foregoing runs, may be said to fall generally in a fairly limited range of between of about 3 and 10 mole percent, and preferably about 6 mole percent when operations are conducted at a normal ambient temperature.

Comparing, on the other hand, the mean speed of polymerization as a function of ethylene concentration with and without the presence of ammonia at the near optimum ratio of 6 mole percent, the speed or conversion rate increases with the concentration of ethylene both with and without ammonia, but such rate increase is more rapid when ammonia is present than in the absence of this reactant. For example, the conversion rate increase may be in certain instances three to four times more rapid in the presence of ammonia than with pure ethylene in the absence of ammonia.

In terms of economic and commercially desirable industrial scale operations, such advantages in accordance herewith become extremely significant. For example, the more the conversion rate or polymerization speed is raised for a given volume of reactor, the more the dimensions of the actual apparatus installation are reduced for a given output, with consequent reduction in investment for apparatus for a particular installation of any desired capacity. Actually, the utilization of an ammonia additive in accordance herewith permits attaining radiation reaction rates and conversion speeds substantially superior to those of conventional irradiation processes which do not utilize the ammonia additive, and even conversion speeds comparable to those conventionally utilized commercially with extremely high pressure or catalytic techniques.

Actually, the polymerization of ethylene in accordance herewith has satisfactorily been accomplished throughout a large range of temperature and pressure conditions, with the reaction temperature ranging all the way from room temperature (or even a little below) up to temperatures of the order of 130° C., although generally and in commercial operations, it is preferred to operate at temperatures in the neighborhood of the ambient temperature or only a little above or below. Within such temperature ranges, increasing the particular operating temperature also increases the conversion speed and the molecular weight of polymer produced. Also, within the range of ammonia additions from zero to 20 mole percent, the presence of ammonia always increases the conversion rate, whatever it may be, for the particular selected temperature within the above noted range. At more elevated temperatures of the order of 70° to 120° C., for example, the optimum value of ammonia proportion may be within the range of from about 3% to 10%, while any particular addition above 10% only produces a small or even insignificant additional increase in the conversion to polymer.

After the polymerization reaction in accordance herewith, the unpolymerized ethylene monomer and any residual ammonia are readily separated from the polymerized product by simple degasification and completely without the difficulties routinely encountered in the elimination of a catalyst from other polymerization processes operating in solution and/or the presence of a solid catalyst in the final polymeric product. The polyethylene product obtained in accordance herewith is normally solid and has a crystalline melting point generally within the range of from 110° C. to 125° C., depending somewhat upon the particular conditions of operation, since the melting point of the final product is increased when the concentration or the pressure of ethylene in the polymerization reactor is increased. The product of this invention is readily moldable under pressure (in the neighborhood of 300 kg./cm.$^2$ at 200° C.), and the resulting article is translucent and possesses a brilliance, a hardness, and a rigidity comparable to those characteristics of conventional polyethylene materials formed by the conventional "low pressure" catalytic process. The densities of polymeric products in accordance herewith are of the order of 0.930–0.935—i.e., intermediate between the densities of polyethylene materials produced by the conventional "high pressure" and "low pressure" processes.

As a further distinction of the polymer product formed in accordance herewith from conventional polyethylene materials may be noted the fact that it contains small quantities of combined nitrogen, in very minute proportions of the order, perhaps, 0.05% by weight, and, apparently, generally corresponding to about one atom of nitrogen for a polymer chain having a molecular weight of about 30,000, with the nitrogen fixed as a result of recombination of the radicals $CH_2NH_2$. The resistance of the products hereof to elongation is of the order of 200 kg./cm.$^2$, ranging from about 190–210 kg./cm.$^2$. These values, as with the densities as above noted, fall generally between polyethylene materials manufactured by conventional "low pressure" and "high pressure" techniques. The resistance to rupture and to stretching is excellent and generally superior to those of even the stronger "low pressure" polyethylene materials.

Although a variety of sources and types of irradiation produced satisfactory results in accordance herewith, the type preferably utilized according to this invention is gamma radiation. As will be understood, a convenient source of this type of radiation on commercial scale is cobalt 60 having a half life of about 5.3 years, but other sources of gamma radiation also produce satisfactory results in accordance herewith—e.g., such as cesium 137, tantalum 182, etc., as well as other known sources such as potassium 40, bismuth 214, proactinium 234, thallium 208, lead 211, fusion products of nuclear reactors, etc. Satisfactory results are also achieved in accordance herewith utilizing other types of radiation although, as noted above, gamma radiation may be preferred particularly for commercial operation. Thus, X-ray generators produce satisfactory results, as well as sources of alpha and beta radiation and/or neutron stream bombardment.

As noted regarding the foregoing illustrative data, reactions in accordance herewith are satisfactorily achieved in simple autoclaves in batch-type operations with successive charges of ethylene and ammonia. Satisfactory results have also been achieved, however, in reactors fed with ethylene and with an appropriate amount of ammonia gradually as the materials enter into reaction, so that there is easily achieved and maintained a more or less constant pressure in the reactor and the composition of the gaseous phase is readily regulated. Similarly satisfactory results are achieved in accordance herewith with a continuous operation in which the polymer is withdrawn from the reaction zone continuously and gradually as it is formed. As will also be understood, although the previous description related primarily to monomeric ethylene as the starting material, there is to be comprehended within the teachings hereof the utilization of previously formed ethylene polymer for further polymerization in accordance herewith and whether such polymer was formed originally according to the instant teachings or by other polymerization techniques.

As a further feature of this invention and for producing even more enhanced results as to quality of product and efficiency of conversion and yield in accordance herewith, either or both of the ethylene and ammonia reactants are treated to be supplied in an extremely pure condition. Indeed, one form of such super-purification treatment for use in conjunction herewith may be noted from the following illustrative techniques.

For example, and as purely illustrative, the data noted below were all obtained under substantially comparable operating conditions including utilization of an autoclave having a volume of about 0.2 liter with an ethylene concentration of about 14 moles per liter and a proportion of ammonia of about 6 mole percent based on the ethylene. The source of radiation in each case was cobalt 60 at an intensity of 500 rad per minute for 24 hours to produce a total dosage of about 0.72M rad, with the operating temperatures being about 19°–20° C.

As a control run, a commercial ethylene was used having a purity of about 99.96% and containing such contaminants as saturated hydrocarbons (less than 70 p.p.m.), other unsaturated hydrocarbons (less than 2 p.p.m.), oxygen (15 p.p.m.), nitrogen (70 p.p.m.), and carbon dioxide (300 p.p.m.). This commercial material was condensed at −195° C. in a trap and degased under vacuum, and is designated in the data indicated below by the letter M. In the same manner, the ammonia to be used was drawn from a standard tank of commercial ammonia, condensed in a trap at −195° C., and degased under vacuum, and is designated in the data below by the letter N.

Utilizing such components in the autoclave and exposed for 24 hours to the radiation, a solid white polymer was obtained with conversion of 21% of the ethylene. Incidentally, as further indicating the enhanced results hereof, the same run effected in the absence of ammonia only gave a 10% conversion of ethylene.

Prior to repeating a run under the same conditions for comparative purposes, the ethylene was preliminarily purified by passing it, in gaseous state, successively over a series of reactive materials such as calcium chloride, ascarite, ammonium perchlorate, etc., after which it was condensed at −190° C. and degased under vacuum, and, finally fractionated so that only the heart fraction was charged into the autoclave. This material is designated among the data below by the letter A. The ammonia utilized was that as prepared above and designated as N.

In this case, a conversion of 25% of the ethylene was obtained after 24 hours of irradiation, instead of the 21% obtained above. The conversion was thus multiplied by an improvement index factor (K) in the neighborhood of 1.2. Similarly, it is to be noted that same run repeated with ethylene A but in the absence of ammonia and under the same conditions gave a conversion of only 22%. Such results are in accord with the order of magnitude of the previously noted runs, and appear to demonstrate that the purified ammonia N had the effect there noteably of compensating for the retarding roll of the impurities of ethylene M.

A further comparable run was made utilizing ethylene A as in the run note above and with ammonia having yet an additional purification treatment which consisted in passing the ammonia over a mass of freshly cut metallic sodium and subsequent degasification as with ammonia N. The purified reactant is indicated in these data by the notation NP. In this case, the conversion of ethylene after 24 hours was 29%, thus giving an improvement factor K of 1.4.

In a further run, instead of using commercial ammonia, whether or not purified, there was used synthetic ammonia obtained from pure ammonium salts and treated in the above way with metallic sodium and degasified, which reactant is designated by NF. Utilizing this highly pure product with purified ethylene A, a conversion of 31% of the ethylene was effected in 24 hours to provide an improvement factor K of 1.5.

The various data from the foregoing trails are summarized in the following Table II.

TABLE II

| Reactants | Conversion, Percent $C_2H_4$ | Improvement Factor K |
|---|---|---|
| M+N | 21 | 1.0 |
| M | 10 | 0.48 |
| A+N | 25 | 1.2 |
| A | 22 | 1.05 |
| A+NP | 29 | 1.4 |
| A+NF | 31 | 1.5 |

As will be apparent from the foregoing, the effectiveness and advantages of this invention, particularly with regard to the utilization of ammonia as a reactive additive in the polymerization process, are even further increased if the ethylene and/or ammonia materials are introduced into the polymerization reactor in extremely pure states, although the foregoing particular methods of super-purification are not to be understood as limiting this aspect of the invention. Similarly, the greatest extent of enhancement may be contributed to the final purification of the ethylene fraction, although additional purification of ammonia also has the noted result, despite the fact that the ammonia is present in relatively small proportions.

Thus, as will be understood from the foregoing, there are provided in accordance herewith techniques and methods for the polymerization of ethylene under the action of ionizing irradiation but with enhanced speeds of reaction and conversion yields satisfactorily high for utilization in commercial scale installations, yet without the necessity for high pressure or high temperature operation or excessive irradiation levels. Similarly, as further features hereof, additionally enhanced efficiencies are achieved by purification of the ethylene and ammonia reactants, to achieve results comparable to or surpassing other high or low pressure techniques for the catalytic polymerization of ethylene in commercial scale operations. Apparently because of the utilization in accordance herewith of a small proportion of ammonia during the polymerization step, the actual polyethylene products of this invention are chemically and physically distinguishable from polyethylene materials produced by other techniques, and also possess enhanced advantages for commercial use.

While the methods and products described herein form preferred embodiments of this invention, this invention is not limited to these precise methods and products, and changes may be made therein without departing from the scope of this invention which is defined in the appended claims.

What is claimed is:

1. In a process of the character described for the polymerization of ethylene into a substantially solid polymeric product in the presence of ionizing radiation, the steps which comprise in combination introducing ethylene into a reaction zone for polymerizing reaction therein, also introducing into said reaction zone ammonia as a polymerization accelerating reactant, subjecting said ethylene and ammonia in said reaction zone to the irradiating action of ionizing radiations effecting said polymerization of at least a substantial portion of said ethylene into said polymeric product, and separating said polymeric product from residual unpolymerized ethylene and ammonia after said polymerization reaction.

2. A process as recited in claim 1 in which said ammonia is present during said polymerization reaction in an amount up to about 20 moles of ammonia per 100 moles of ethylene.

3. A process as recited in claim 1 in which the temperature of said reaction zone during said polymerization reaction is maintained within the range of from ambient temperature up to about 130° C.

4. A process as recited in claim 1 in which said ammonia is present during said reaction in an amount within the range of about 3 to 10 mole percent based on said ethylene.

5. A process as recited in claim 1 in which said ammonia is present during said reaction in an amount of approximately 6 mole percent based on said ethylene.

6. A process as recited in claim 1 in which the temperature of said reaction zone during said polymerization reaction is maintained within the range of about 70° to 120° C.

7. A process as recited in claim 1 in which said reaction zone is pressurized and said ethylene and ammonia reactants are maintained therein under substantial super atmospheric pressure during said reaction.

8. A process as recited in claim 1 in which said ionizing radiations are gamma rays.

9. As a composition of matter, a substantially solid ethylene polymer including minor portions of nitrogen combined therein with said ethylene, and further characterized as having been produced in accordance with the process recited in claim 1.

10. In a process of the character described for the polymerization of ethylene into a substantially solid polymeric product in the presence of ionizing radiation and to achieve enhanced efficiencies and conversion rates and yields thereof, the steps which comprise in combination purifying said ethylene to a purity of substantially above 99%, introducing said purified ethylene into a reaction zone for polymerizing reaction therein, also introducing into said reaction zone ammonia as a polymerization accelerating reactant, subjecting said ethylene and ammonia in said reaction zone to the irradiating action of ionizing radiations effecting said polymerization of at least a substantial portion of said ethylene into said polymeric product, and separating polymeric product from residual unpolymerized ethylene and ammonia after said polymerization reaction.

11. A process as recited in claim 10 in which said ethylene is purified prior to said introduction into said reaction zone by beng subjected to fractionation at temperatures of the order of −195° C.

12. A process as recited in claim 10 in which said ethylene is purified prior to said introduction into said reaction zone by subjectng to contact with a contaminant adsorbing and removing component selected from the group consisting of calcium chloride, ascarite, ammonium perchlorate, and mixtures thereof.

13. A process as recited in claim 10 in which said ammonia is also purified prior to said introduction into said reaction zone by fractionation at low temperatures.

14. A process as recited in claim 13 in which said ammonia is purified by being subjected to contact with metallic sodium.

15. A process as recited in claim 10 in which said ammonia is produced as substantially pure synthetic ammonia from ammonium salts and further purified prior to introduction into said reaction zone by being subjected to fractionation and treatment with metallic sodium.

16. As a composition of matter, a substantially solid ethylene polymer including minor portions of nitrogen combined therein with said ethylene, and further characterized as having been produced in accordance with the process recited in claim 10.

References Cited
UNITED STATES PATENTS 2,946,776   7/1960   Scott et al. _____ 260—94.9

JOSEPH L. SCHOFER, *Primary Examiner.*

L. EDELMAN, *Assistant Examiner.*